(12) United States Patent
Dowlatkhah et al.

(10) Patent No.: US 10,887,798 B2
(45) Date of Patent: *Jan. 5, 2021

(54) VERTICAL SLICE MANAGEMENT AND SELECTION LEVERAGING DYNAMIC ALLIANCES OF ACCESS CORE AND SERVICE NETWORK RESOURCES

(71) Applicants: AT&T Intellectual Property I, L.P., Atlanta, GA (US); AT&T Mobility II LLC, Atlanta, GA (US)

(72) Inventors: Sangar Dowlatkhah, Plano, TX (US); Zhi Cui, Sugar Hill, GA (US); Paul Smith, Jr., Heath, TX (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,287

(22) Filed: Apr. 29, 2020

(65) Prior Publication Data
US 2020/0260338 A1    Aug. 13, 2020

Related U.S. Application Data

(63) Continuation of application No. 16/207,675, filed on Dec. 3, 2018, now Pat. No. 10,681,589.

(51) Int. Cl.
*H04L 12/24* (2006.01)
*H04W 28/26* (2009.01)
(Continued)

(52) U.S. Cl.
CPC .......... *H04W 28/26* (2013.01); *H04W 16/02* (2013.01); *H04W 76/10* (2018.02); *H04W 92/04* (2013.01)

(58) Field of Classification Search
CPC ..... H04W 28/26; H04W 16/02; H04W 76/10; H04W 92/04; H04W 28/02; H04L 41/0806; H04L 41/5041
See application file for complete search history.

(56) References Cited

U.S. PATENT DOCUMENTS 9,462,477 B2  10/2016  Ahmad et al.
9,619,287 B2   4/2017  Vincent et al.
(Continued)

FOREIGN PATENT DOCUMENTS

CN    107071782 A       8/2017
EP    3 255 918 A1     12/2017
(Continued)

OTHER PUBLICATIONS

U.S. Appl. No. 16/207,675, filed Dec. 3, 2018.
(Continued)

*Primary Examiner* — Joseph E Dean, Jr.
(74) *Attorney, Agent, or Firm* — Amin, Turocy & Watson, LLP

(57) ABSTRACT

A vertically integrated slice management system is provided that can leverage dynamic alliances of access layer, core layer, and service layer services. The system can instantiate a vertical slice that incorporates one or more services and network functions from a selection of layer slices in order to provide a streamlined and efficient mechanism for serving a user device based on the type of the user device, and the type of service requested.

20 Claims, 10 Drawing Sheets

(51) Int. Cl.
  *H04W 76/10* (2018.01)
  *H04W 16/02* (2009.01)
  *H04W 92/04* (2009.01)

(56) References Cited

U.S. PATENT DOCUMENTS

| | | | |
|---|---|---|---|
| 10,057,777 | B2 | 8/2018 | Li et al. |
| 10,070,344 | B1 | 9/2018 | Dowlatkhah et al. |
| 2011/0125905 | A1 | 5/2011 | Baucke et al. |
| 2016/0156513 | A1 | 6/2016 | Zhang et al. |
| 2016/0353367 | A1 | 12/2016 | Vrzic et al. |
| 2017/0079059 | A1 | 3/2017 | Li et al. |
| 2017/0085493 | A1 | 3/2017 | Senarath et al. |
| 2017/0289791 | A1 | 10/2017 | Yoo et al. |
| 2017/0353927 | A1* | 12/2017 | Neubacher ........ H04W 52/0248 |
| 2018/0077024 | A1 | 3/2018 | Zhang |
| 2018/0220008 | A1 | 8/2018 | Reith |
| 2018/0220276 | A1 | 8/2018 | Senarath et al. |
| 2018/0288654 | A1 | 10/2018 | Shih et al. |

FOREIGN PATENT DOCUMENTS

| | | | |
|---|---|---|---|
| WO | 2017/044151 | A1 | 3/2017 |
| WO | 2017/074486 | A1 | 5/2017 |
| WO | 2017/124003 | A1 | 7/2017 |
| WO | 2017/129230 | A1 | 8/2017 |
| WO | 2018/011607 | A1 | 1/2018 |
| WO | 2018/019184 | A1 | 2/2018 |
| WO | 2018/034156 | A1 | 2/2018 |
| WO | 2018/034321 | A1 | 2/2018 |
| WO | 2018/137499 | A1 | 8/2018 |
| WO | 2018/153432 | A1 | 8/2018 |

OTHER PUBLICATIONS

Li, Qian, et al. "An end-to-end network slicing framework for 5G wireless communication systems" arXiv preprintarXiv:1608.00572 (2016) 13 pages https://arxiv .org/ftp/arxiv/papers/1608/1608.00572.pdf.

Biczok, Gergely, et al. "Manufactured by software: SON-enabled multi-Operator composite services with the 5gExchange." IEEE Communications Magazine 55A (2017): 80-86, 13 pages. https://brage.bi bsys.no/xmlui/bitstream/handle/11250/24 7 4210/%2BSDNenabled% 2Bmultioperator""/o2Bcomposite%2Bservices%2Bwith%2Bthe%2B5G%2BExchange_pdf?sequence=1.

Katsalis, Kostas, et al. "Jox: An event-driven orchestrator for 5g network slicing " IEEE Network Operations and Management Symposium (NOMS).2018. https://www.5g-picture-proj ect.eu/download/jox 2018 eur.pdf.

Zhang, Haijun, et al. "Network Slicing Based 5G and Future Mobile Networks: Mobility, Resource Management and Challenges" IEEE Communications Magazine 55.8 (2017): 138-145, 19 pages. https://arxiv.org/pdf/1704.07038.pdf.

Samdanis, Konstantinos, et al., "From Network Sharing to Multi-tenancy: The 5G Network Slice Broker", IEEE Communications Magazine 54.7 (2016): 32-39. 11 pages. https://arxiv.org/ftp/arxiv/papers/1605/1605.01 201.pdf.

Taleb, Tarik et al. "PERMIT: Network Slicing for Personalized 5G Mobile Telecommunications" IEEE Communications Magazine 55.5 (2017): 88-93. 6 pages.http://mosaic-lab.org/uploads/papers/e706274e-8955-49c0-8385-b9a48087b99f.pdf.

Zhou, Xuan, et al. "Network Slicing as a Service: Enabling Enterprises' Own Software-Defined Cellular Networks." IEEE Communications Magazine 54.7 (2016): 146-153, 8 pages. http://www.rongpeng.info/files/Paper_CommagNSaaS2016.pdf.

Non-Final Office Action received for U.S. Appl. No. 16/207,675 dated Mar. 21, 2019, 19 pages.

Final Office Action received for U.S. Appl. No. 16/207,675 dated Oct. 29, 2019, 15 pages.

* cited by examiner

VERTICAL SLICE MANAGEMENT AND SELECTION LEVERAGING DYNAMIC ALLIANCES OF ACCESS CORE AND SERVICE NETWORK RESOURCES

RELATED APPLICATION

The subject patent application is a continuation of, and claims priority to, U.S. patent application Ser. No. 16/207,675 (now U.S. Pat. No. 10,681,589), filed Dec. 3, 2018, and entitled "VERTICAL SLICE MANAGEMENT AND SELECTION LEVERAGING DYNAMIC ALLIANCES OF ACCESS CORE AND SERVICE NETWORK RESOURCES," the entirety of which application is hereby incorporated by reference herein.

TECHNICAL FIELD

The present application relates generally to a field of mobile communication and, more specifically to leveraging dynamic alliances of access, core, and service network resources.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and Sixth Generation (6G) standards for wireless communications. Unique challenges exist to provide levels of service associated with forthcoming 5G, 6G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
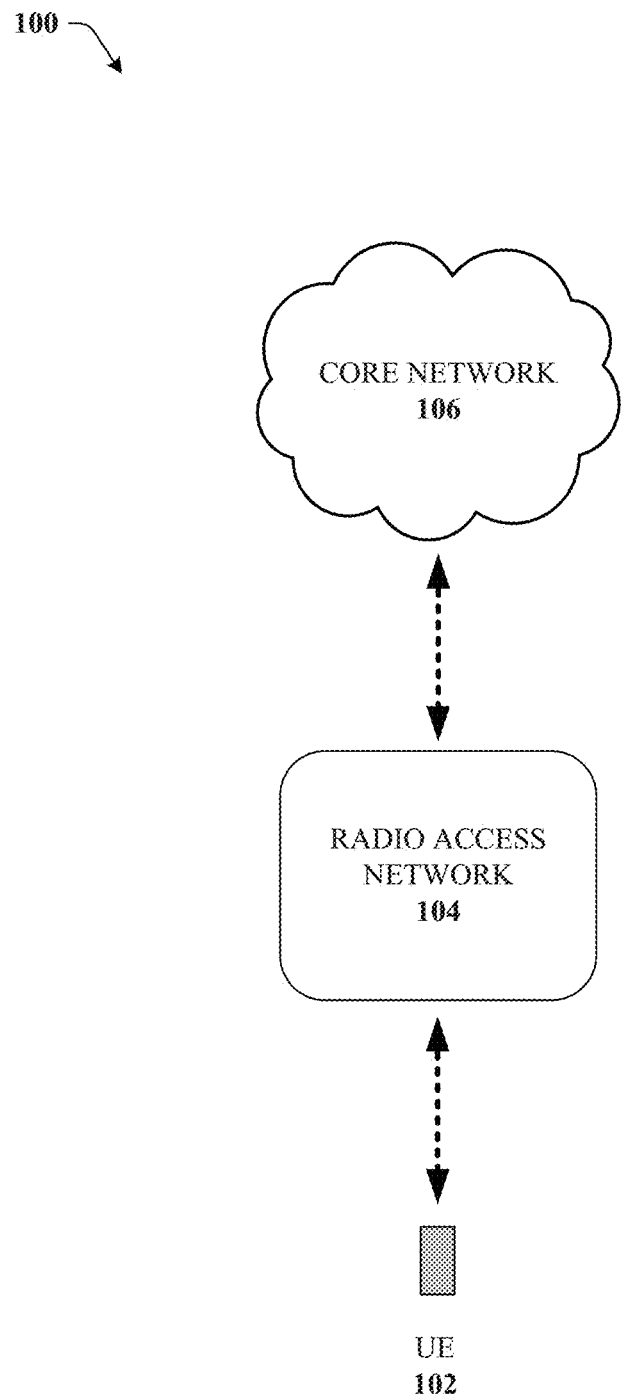
FIG. 1 illustrates an example wireless communication system for vertically integrating slices in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a vertically integrated slice management system that can leverage dynamic alliances of access layer, core layer, and service layer services. The system can instantiate a vertical slice that incorporates one or more services and network functions from a selection of layer slices in order to provide a streamlined and efficient mechanism for serving a user device based on the type of the user device, and the type of service requested. The pairing function that can dynamically select slices in each layer can include a software defined networking agent to communicate the management functionality for each layer as well as to create an overview of available resources of each adjacent layer. The slice pairing function can also include policy and Quality of Service (QoS) functions that can create a controlling function of resource delegations according to what is available what can be used in each layer to orchestrate an optimal vertical slice for any given services. The vertical slices can use exclusively use a slice on each layer or can share resources with other vertical resources.

Note that for simplicity we use the radio network node or simply network node is used for gNB. It refers to any type of network node that serves UE and/or connected to other network node or network element or any radio node from where UE receives signal. Examples of hosting layer radio network nodes are Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc. Other types of access point devices can include 6LowPan, Wi-Fi, Range extenders, femtocells, and other enhancing layer devices.

Likewise, for reception we use the term user equipment (UE). It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports are also interchangeably used but carry the same meaning in this disclosure.

In various embodiments, a system can comprise a processor and a memory that stores executable instructions that, when executed by the processor facilitate performance of operations. The operations can comprise receiving, from a user equipment device, a connection request comprising information indicating an associated network service. The operations can also include instantiating a vertical network slice comprising portions of a group of network slices, wherein a portion of the portions comprises a network function related to the network service. The operations can also comprise facilitating operation of the network service for the user equipment device via the vertical network slice.

In another embodiment, method comprises facilitating, by a network device comprising a processor, receiving a network service request from a mobile device, wherein the network service request is associated with a network service. The method can also comprise selecting, by the network device, a first network function of a first layer slice and a second network function of a second layer slice, wherein the first network function and the second network function facilitate operation of the network service. The method can also comprise instantiating, by the network device, a vertical slice comprising the first network function and the second network function, wherein the vertical slice is configured to facilitate execution of the network service. The method can also comprise facilitating, by the network device, transmitting an output of the network service to the mobile device.

In another embodiment machine-readable storage medium, comprising executable instructions that, when executed by a processor of a device, facilitate performance of operations. The operations can comprise receiving a network service request from a mobile device, wherein the network service request is associated with a network service of a mobile network. The operations can also comprise selecting a first network function of a first layer slice and a second network function of a second layer slice, wherein the first network function and the second network function facilitate operation of the network service. The operations can also comprise instantiating a vertical slice of the mobile network comprising the first network function and the second network function, wherein the vertical slice is configured to execute the network service. The operations can also comprise executing the network service using the vertical slice.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. The mechanical parts can include sensors on a float, tilt monitors, and etc. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), machine to machine, satellite, microwave, laser, Z-Wave, Zigbee and other 802.XX wireless technologies and/or legacy telecommunication technologies.

FIG. 1 illustrates an example wireless communication system for vertically integrating slices in accordance with various aspects and embodiments of the subject disclosure.

A UE device 102 can connect to a mobile network (e.g., core network 106) via radio access network device 104. In one or more embodiments, various slices (logical collection of network services across a layer) can be instantiated to manage communications and services for the UE device 102.

Network slices are form of virtual network architecture that comprise a defined set of virtual network functions designed to facilitate one or more computing purposes. Various slices can be instantiated on the radio access network device 104 or the core network 106, each of the network slices can perform a set of operations to facilitate one or more services.

Each slice can comprise an independent set of logical network functions that support the requirements of the particular use case, with the term 'logical' referring to software. Each slice can be optimized to provide the resources and network topology for the specific service and traffic that will use the slice. Functions such as speed, capacity, connectivity and coverage will be allocated to meet the particular demands of each use case, but functional components may also be shared across different network slices.

Slice can be found at each layer of the network, with access slices that provide functionality for the radio access network 104, core slices that provide functionality and services for the core network 106 (e.g., authentication, security, gateway), service layer slices that provide functionality for defined services, and Internet of Things (IoT) related slices that provide functionality and services for various IoT devices including sensors, MEMs machines, appliances, embedded device, user equipment device, and etc. Each slice at each layer can comprise a group of network functions and services that can provide assistance for that layer.

Any single device that connects to the mobile network however, depending on the type of device, service requested, capabilities, and etc., may only require one or more of the network functions for one or more of the slice layers. Therefore, in traditional systems, providing an entire slice for the operation of every single device is not an optimal use of resources, and thus this disclosure describes a vertical management system that can more optimally assign resources to a UE device 102.

Each part of the network can be composed of a specific functionality that are tailored for a specific service or group of functions. The important aspect of the architecture is the ability to perform the given task efficiently and optimally on each layer. To be able to achieve that the network need to orchestrate and communicate each layer component with the rest of the network resources. This can be done by consolidating the network resources vertically, by adding pairing functionality between the slices of the network layers and have an overall overview of the network by utilizing global SDN management functionality. This can enable the entire network to operate in consortium, with specific and pin-pointed serviceability.

In a 6G virtual network, each layer of the network instantiated and tailored for a specific functionality with the given policy and service accessibility. However, to be able to optimally configure the network for a certain service or number of services for an enterprise customer, there is a need to orchestrate different aspect of the network such as: Access network which can manage capacity, coverage, and available technology; Core network which can manage slice composition and functionality, location of the slice, capacity and elasticity; a Transport Layer; and a Service Execution Layer.

Each part of the network can independently create a consolidation of the resources for a specific functionality as slices. However, in order to bring efficiency and streamlining of the network, these vertical slices can then be reused for more than one service. To be able to achieve this, a global management system can be provided to bring an overview of existing and available slices in the network on each layer plus a pairing function between each network layer in order to create a vertical dynamic slice which can utilize one or more slices in each layer depend on the service composition.

Each paring function can be composed of SDN agent to communicate the management functionality for each layer as well as create an overview of available resources of each adjacent layer and Policy and QoS functions: These can create a controlling function of resource delegations according to what is available what can be used in each layer to orchestrate an optimal vertical slice for any given services. The vertical slices can exclusively use a slice on each layer or can share resources with other vertical resources.

Figure 2:
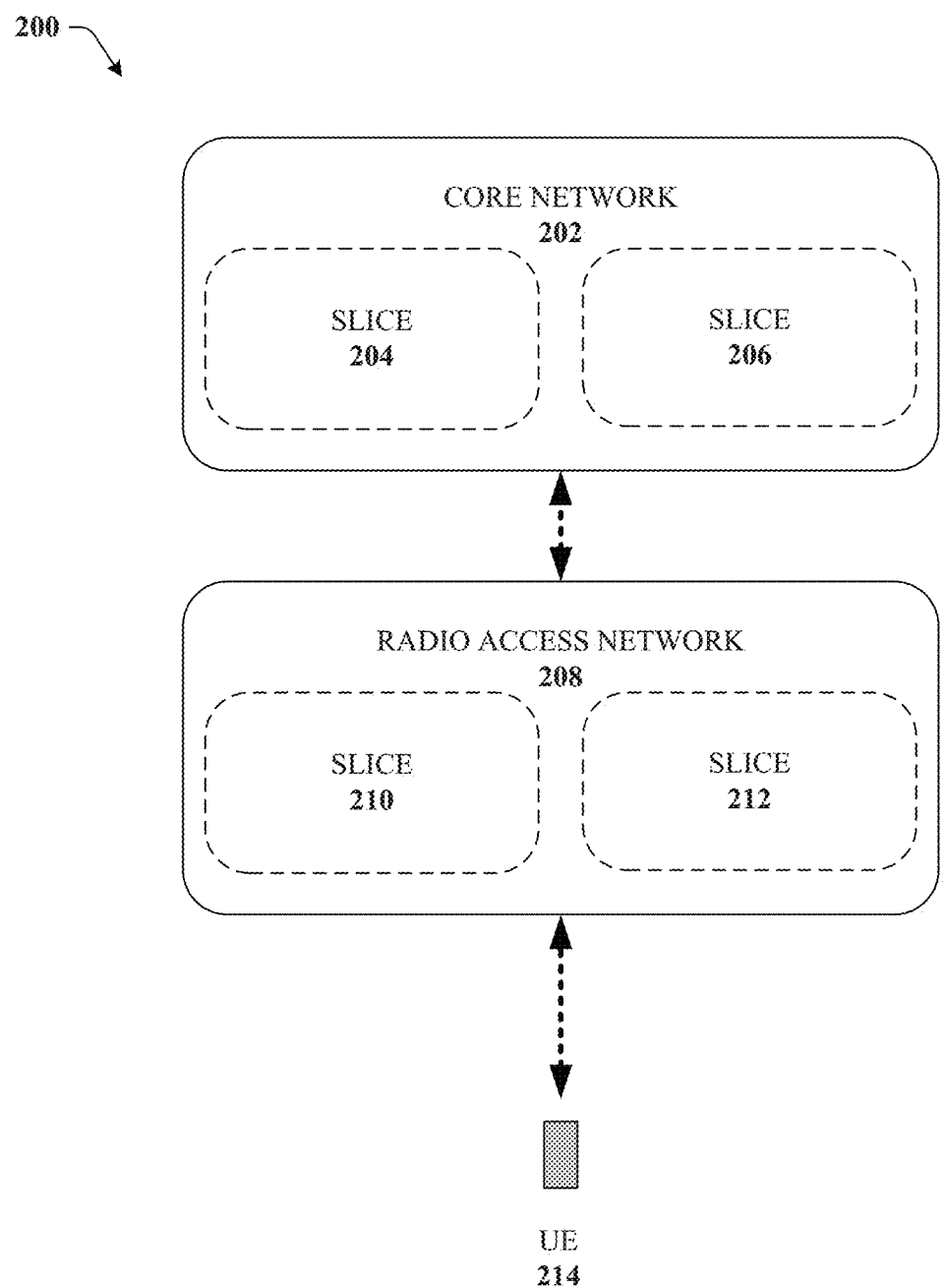
FIG. 2 illustrates slices in different layers of a wireless communication system in accordance with various aspects and embodiments of the subject disclosure.

Turning now to FIG. 2, illustrated are slices in different layers of a wireless communication system in accordance with various aspects and embodiments of the subject disclosure.

Core network 202 can comprise slices 204 and 206 that each comprise a group, exclusive or overlapping, of network functions to perform specified tasks or general tasks for various different devices and services including UE 214. Similarly, radio access network 208 can also comprise slice 210 and slice 212 to perform various tasks and functions for UE 214.

It is to be appreciated that while UE 214 is shown, in this figure and in other figures, the devices are interchangeable, and UE 214 could represent one or more embedded devices, sensors, and other IoT devices.

Figure 3:
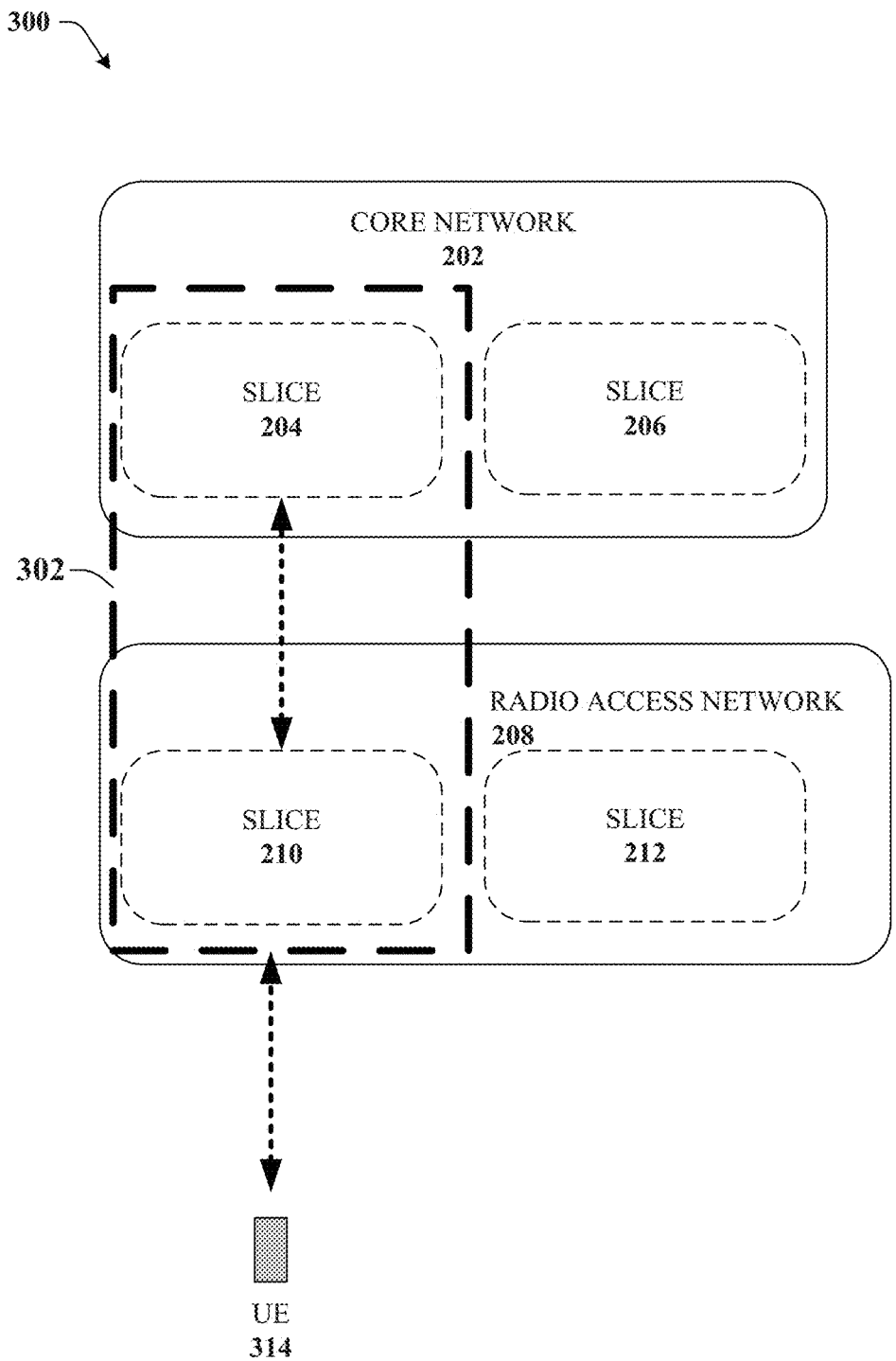
FIG. 3 illustrates an example vertical slice leveraging slice layers in accordance with various aspects and embodiments of the subject disclosure.

In FIG. 3, a vertical slice 302 is shown that incorporates slice 204 and 210 from core network 202 and radio access network 208 respectively. This slice can incorporate the slices from the layers (e.g., the core layer associated with core network 202 and the access layer associated with radio access network 208). It is to be appreciated that in other embodiments, other layers can include IoT layers and radio resource layers with respective IoT slices and radio resource slices. In an embodiment, the radio resource slices can provide management and functionality related to time, frequency, and spatial radio resources, while the IoT slices can provide functionality related to IoT devices.

Additionally, while the core slices are shown as being part of the core network 202, and the radio access slices are shown as being part of the radio access network 208, in other embodiments, devices in any part of the network can be used to instantiate slices from other layers of the mobile network. Thus, a radio access network device, e.g., a base station device, network node, or gNB can house servers that can instantiate both radio access layer slices as well as core network slices to provide functionality of the entire network at one device. The vertical slice 302 can thus span across devices and network layers as shown here, or can logically span network layers while being instantiated by a server in one of the layers.

In an embodiment, the vertical slice 302 can be instantiated for a predetermined time slot, or for a defined time duration. At the end of the duration, to enable different services, a vertical slice comprising different slices from the slice layers can be incorporated. At a different time duration, a new vertical slice comprising slice 206 and 212 can be instantiated. In other embodiments, the vertical slices can coexist, and share network functions and resources. For example, slice 210 can be a part of slice 302 as well as another vertical slice.

Figure 4:
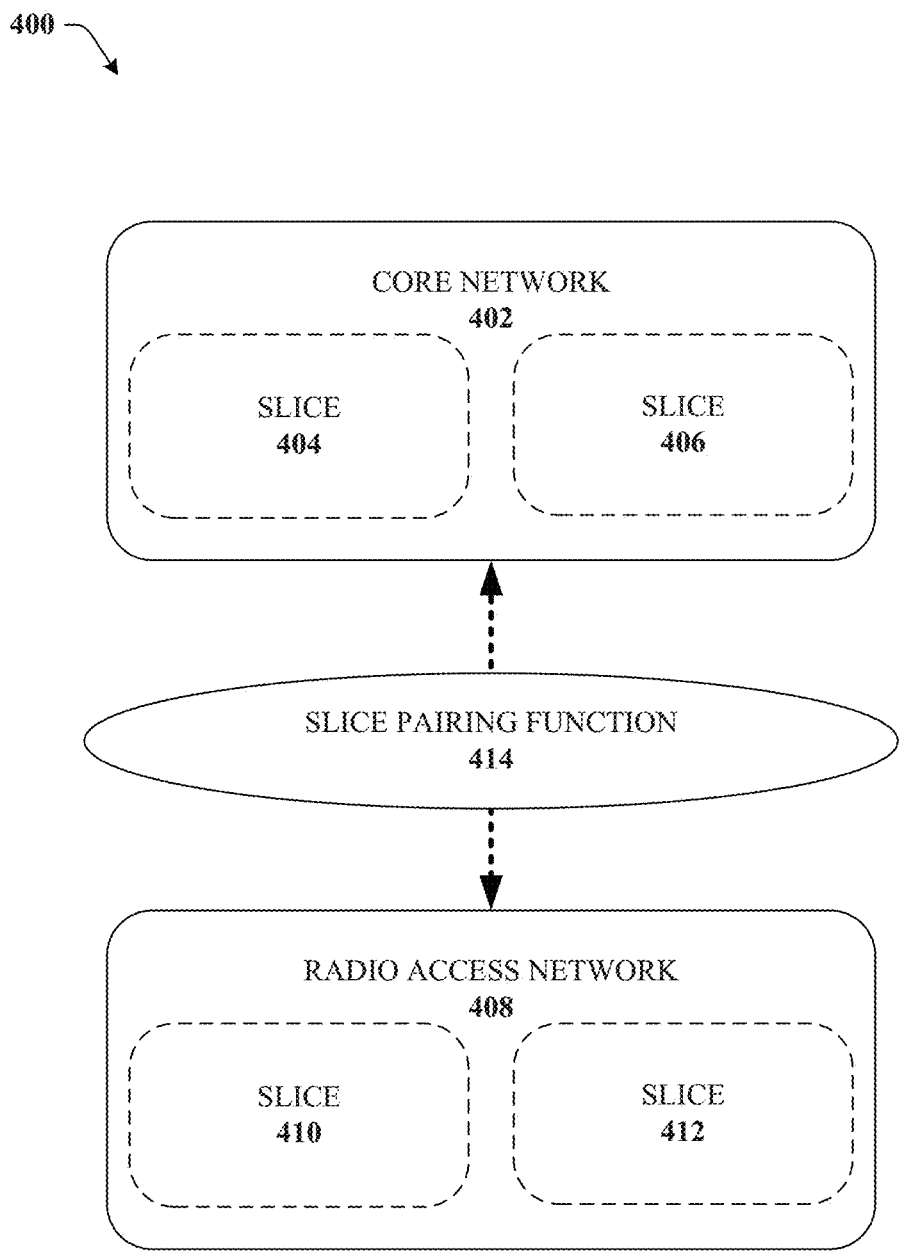
FIG. 4 illustrates an example slice pairing function in accordance with various aspects and embodiments of the subject disclosure.

Turning now to FIG. 4, illustrated is an example slice pairing function in accordance with various aspects and embodiments of the subject disclosure.

A slice pairing function 414 can include a software defined networking agent to communicate the management functionality for each layer (e.g., core layer in core network 402 comprising slice 404 and 406 and radio access layer in radio access network 408 comprising slice 410 and 412) as well as to create an overview of available resources of each adjacent layer. The slice pairing function can also include policy and Quality of Service (QoS) functions that can create a controlling function of resource delegations according to what is available what can be used in each layer to orchestrate an optimal vertical slice for any given services.

Slicing the radio access network would enable the operator to micro design RAN architecture for each slice with its own radio elements which would encompasses: Dedicated UE association with specific slice; access control; load balancing; and Customized Control and User plan configuration.

This solution would enable carrier to create access network specifically for a service instead generic solution with radio node specific access network. This will enable the operator to further customize the 6G network's User and control plane configuration for a slice specific formation. This can make the slice more of a user/service oriented instead of a physical constrained.

As an example, the dynamic slice configuration can depend on such factors as the multiple public land mobile networks with each gNB with a primary public land mobile network and an additional public land mobile network for each operator leasing the resources. Another factor can include using the public land mobile network for identifying different access slices and distinguishing between different host layer resources, traffic type, traffic load, and QoS requirement.

The RAN architecture of each of the slices can be dynamically configured. Slice #1 can only operate on a macro cell, slice #2 can only operate on small cells, and slice #3 can operate on both macro and small cells. In another embodiment, slice #1 could expand its operation to small cells, while slice #3 can terminate operation on some of the small cells.

Figure 5:
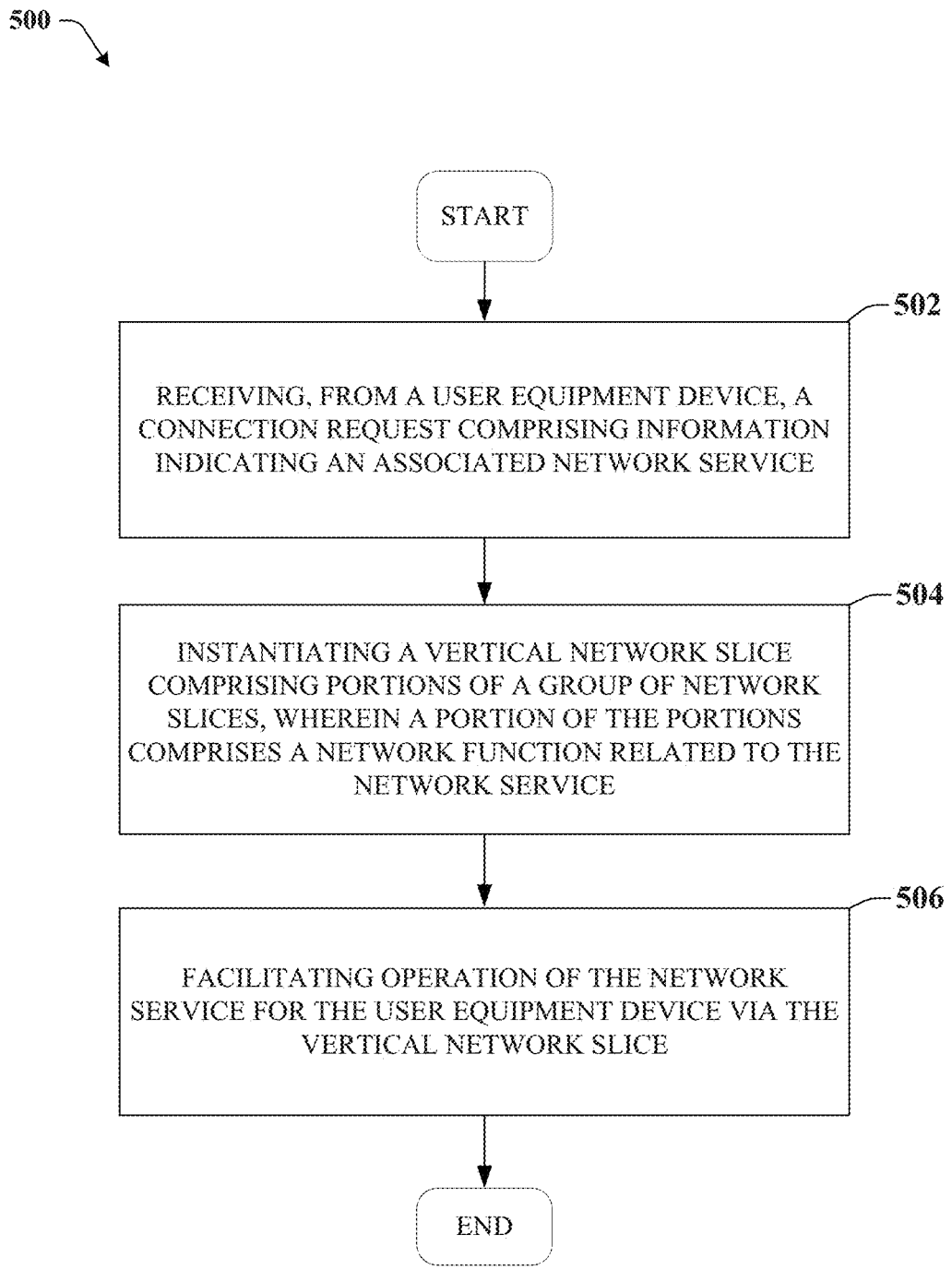
FIG. 5 illustrates an example method for vertically slice management and selection in accordance with various aspects and embodiments of the subject disclosure.
Figure 6:
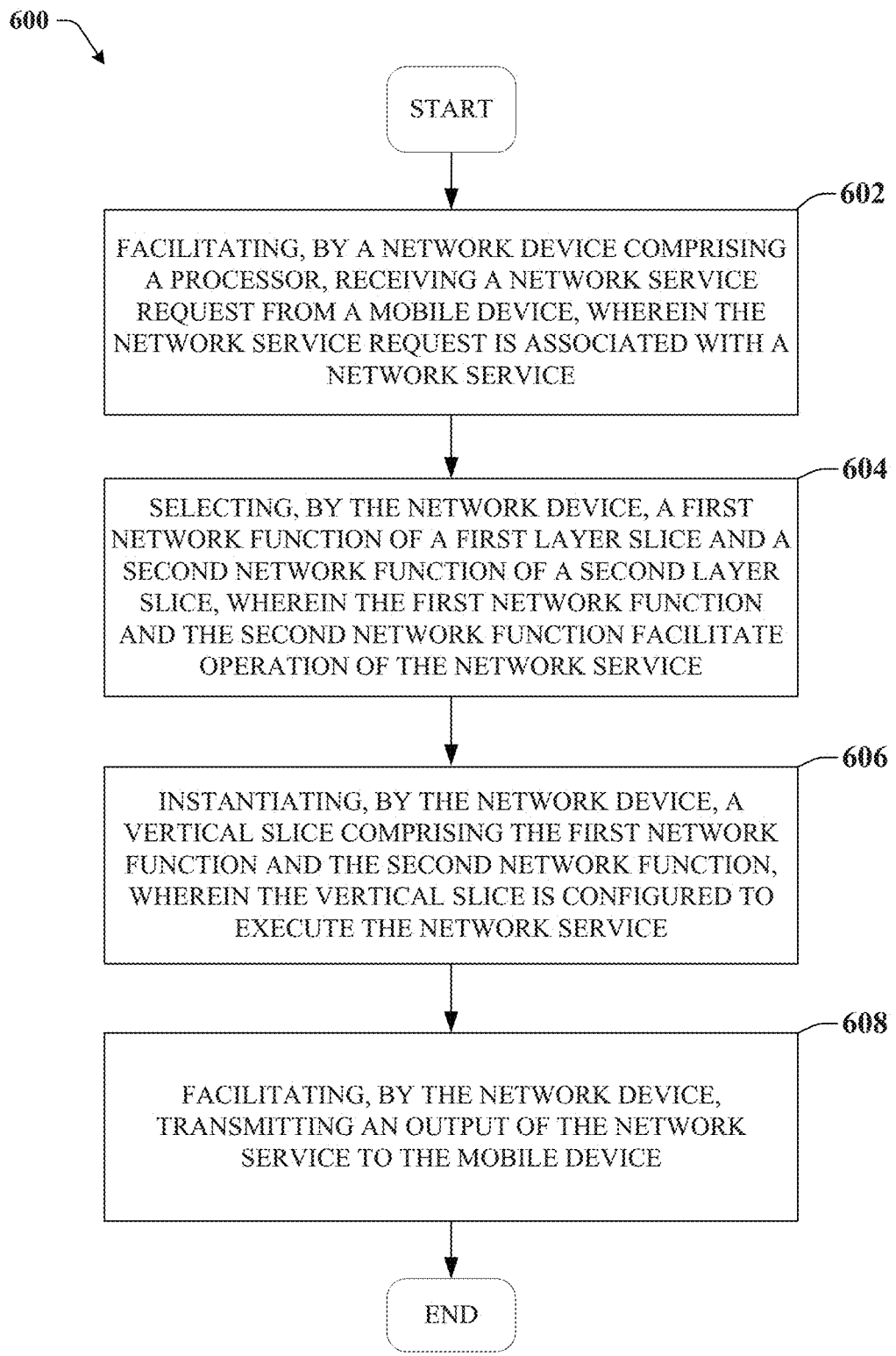
FIG. 6 illustrates an example method for vertically slice management and selection in accordance with various aspects and embodiments of the subject disclosure.
Figure 7:
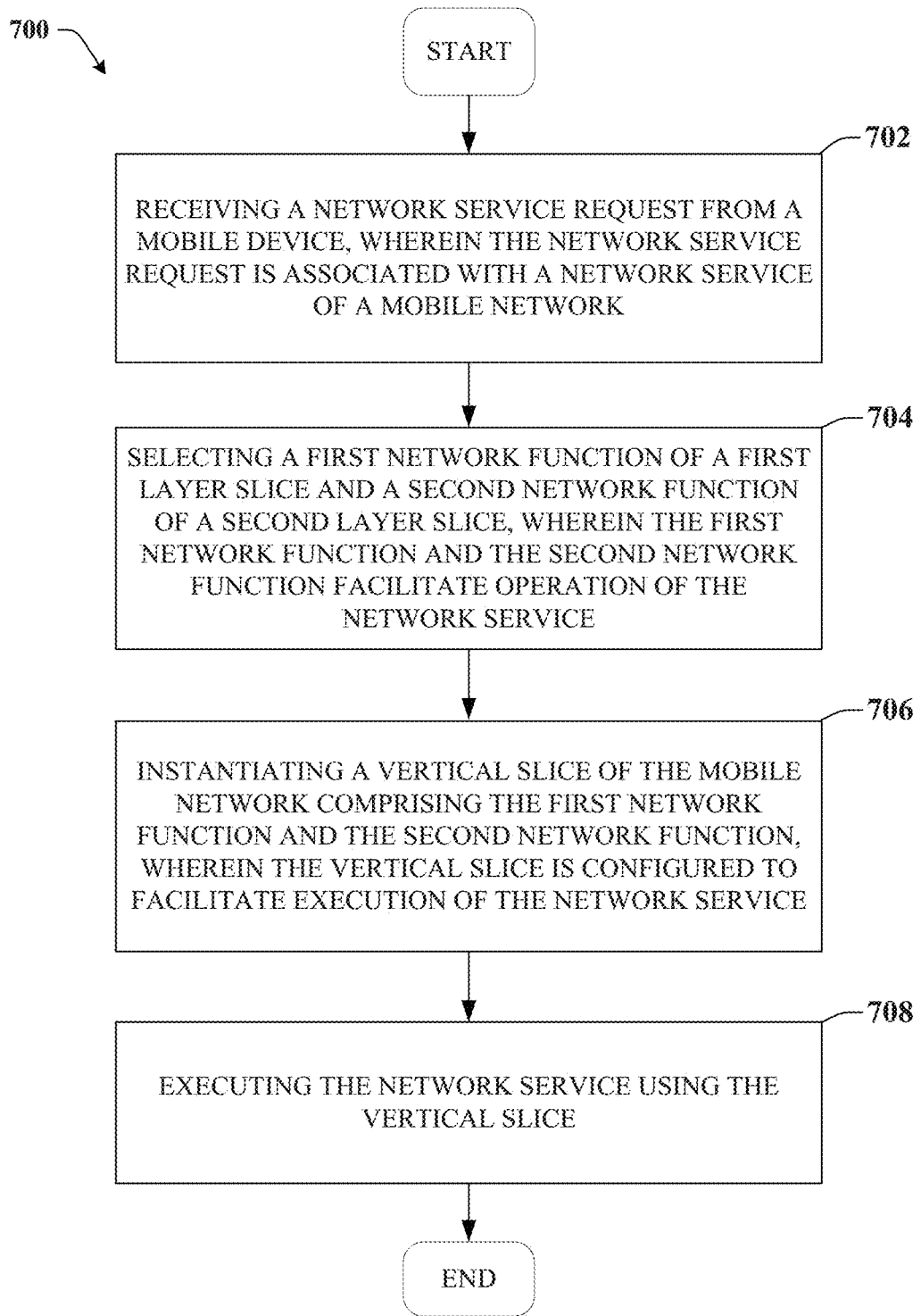
FIG. 7 illustrates an example method for vertically slice management and selection in accordance with various aspects and embodiments of the subject disclosure.

FIGS. 5-7 illustrates processes in connection with the aforementioned systems. The process in FIGS. 5-7 can be implemented for example by the systems in FIGS. 1-4 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 5 illustrates an example method 500 an example method for vertically slice management and selection in accordance with various aspects and embodiments of the subject disclosure.

Method 500 can begin at 502 wherein the method includes receiving, from a user equipment device, a connection request comprising information indicating an associated network serv.

At 504, the method can include instantiating a vertical network slice comprising portions of a group of network slices, wherein a portion of the portions comprises a network function related to the network service.

At 506, the method can include facilitating operation of the network service for the user equipment device via the vertical network slice.

FIG. 6 illustrates an example method 600 an example method for vertically slice management and selection in accordance with various aspects and embodiments of the subject disclosure.

Method 600 can begin at 602 wherein the method includes facilitating, by a network device comprising a processor, receiving a network service request from a mobile device, wherein the network service request is associated with a network service.

At 604, the method can include selecting, by the network device, a first network function of a first layer slice and a second network function of a second layer slice, wherein the first network function and the second network function facilitate operation of the network service.

At 606, the method can include instantiating, by the network device, a vertical slice comprising the first network function and the second network function, wherein the vertical slice is configured to execute the network service.

At 608, the method can include facilitating, by the network device, transmitting an output of the network service to the mobile device FIG. 7 illustrates an example method 700 an example method for vertically slice management and selection in accordance with various aspects and embodiments of the subject disclosure.

Method 700 can begin at 702 wherein the method includes receiving a network service request from a mobile device, wherein the network service request is associated with a network service of a mobile network.

At 704, the method can include selecting a first network function of a first layer slice and a second network function of a second layer slice, wherein the first network function and the second network function facilitate operation of the network service.

At 706, the method can include instantiating a vertical slice of the mobile network comprising the first network function and the second network function, wherein the vertical slice is configured to facilitate execution of the network service.

At 708, the method can include executing the network service using the vertical slice.

Figure 8:
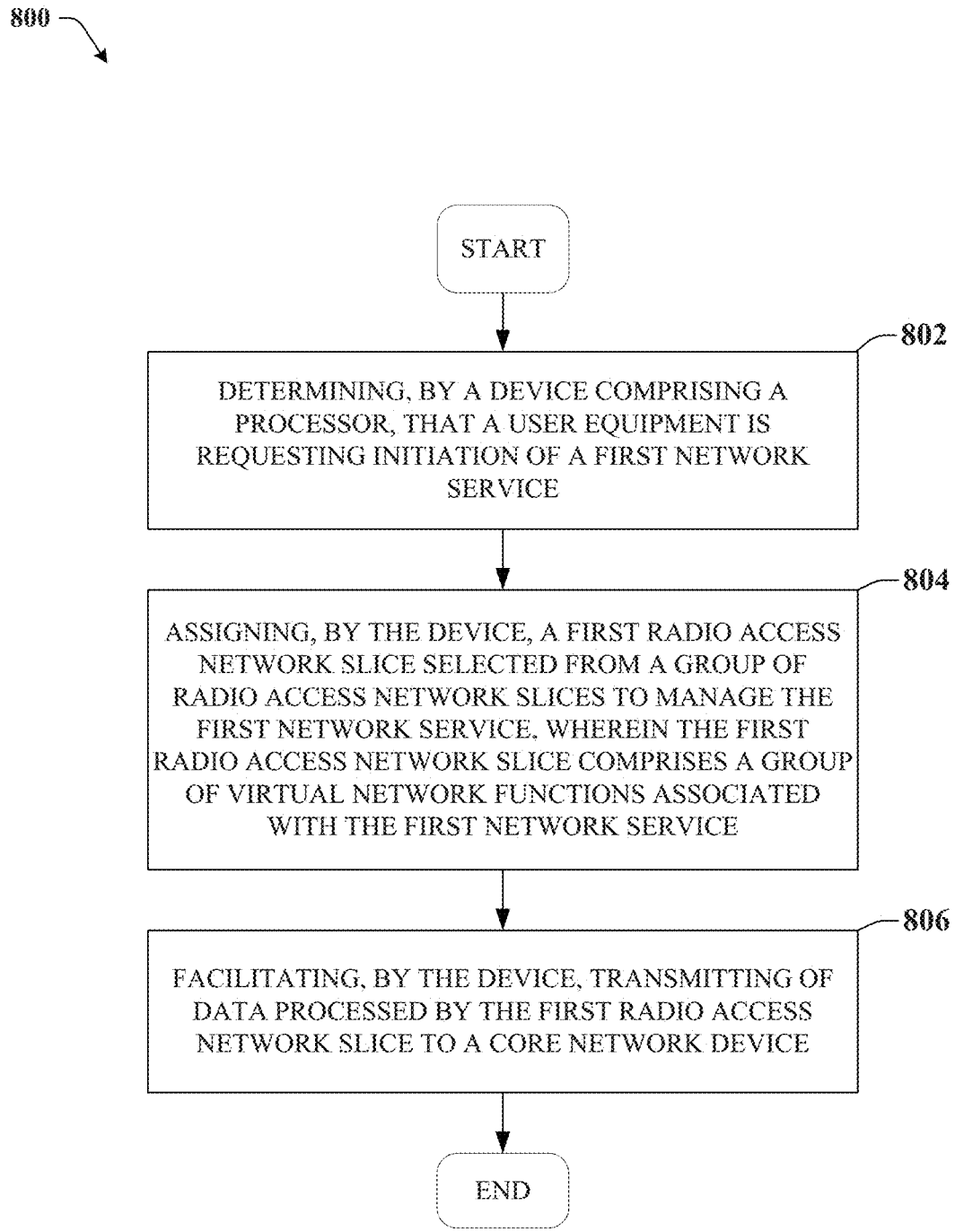
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It is should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
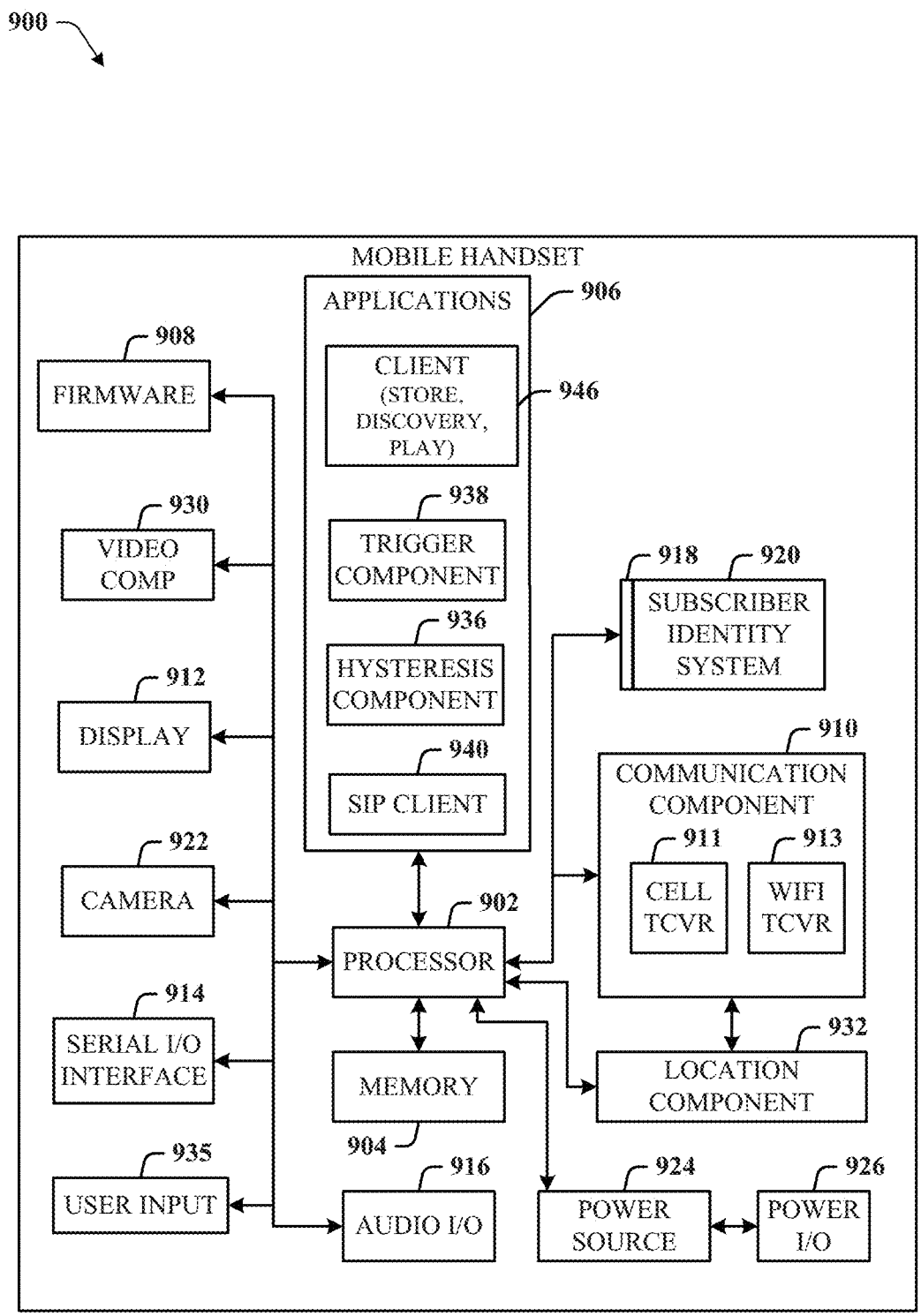
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
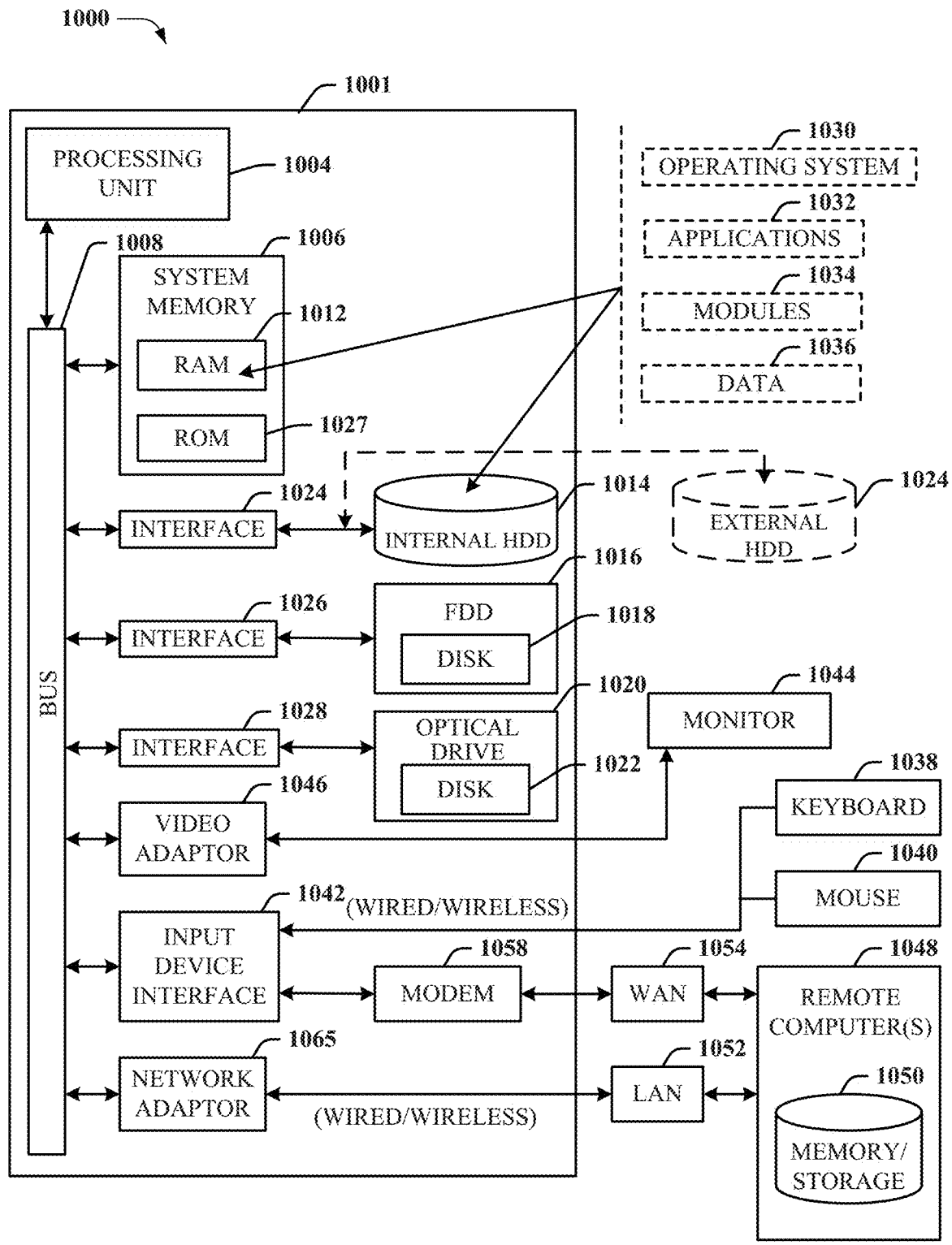
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions that, when executed by the processor, facilitate performance of operations, comprising:
instantiating, for a first time slot, a first vertical network slice associated with a first network service, wherein the first vertical network slice comprises a first network slice associated with a first network and a second network slice associated with a second network that is different than the first network; and
instantiating, for a second time slot, a second vertical network slice associated with a second network service, wherein the second vertical network slice comprises a third network slice associated with the first network and a fourth network slice associated with the second network.

2. The system of claim 1, wherein the first network is a radio access network and the second network is a core network.

3. The system of claim 1, wherein the first network slice comprises at least one of a core slice, or a backhaul slice.

4. The system of claim 1, wherein the first vertical network slice comprises a slice pairing function that facilitates pairing slices from the first network and the second network.

5. The system of claim 4, wherein the slice pairing function comprises a software defined networking management function.

6. The system of claim 4, wherein the slice pairing function facilitates logical connectivity between the first network and the second network.

7. The system of claim 1, wherein the second vertical network slice shares a portion of the first network slice or the second network slice with the first vertical network slice.

8. A method, comprising:
   instantiating, by a network device comprising a processor, for a first time slot, a first vertical network slice associated with a first network service, wherein the first vertical network slice comprises a first network slice associated with a first network and a second network slice associated with a second network that is different than the first network; and
   instantiating, by the network device, for a second time slot, a second vertical network slice associated with a second network service, wherein the second vertical network slice comprises a third network slice associated with the first network and a fourth network slice associated with the second network.

9. The method of claim 8, wherein the first network is a radio access network and the second network is a core network.

10. The method of claim 8, wherein the first network slice comprises at least one of an access slice, or a service slice.

11. The method of claim 8, wherein the first vertical network slice facilitates pairing slices from the first network and the second network.

12. The method of claim 11, wherein the pairing employs a software defined networking management function.

13. The method of claim 11, wherein the pairing facilitates logical connectivity between the first network and the second network.

14. The method of claim 8, wherein the second vertical network slice shares a portion of the first network slice or the second network slice with the first vertical network slice.

15. A non-transitory machine-readable medium, comprising executable instructions that, when executed by a processor of a device, facilitate performance of operations, comprising:
   instantiating, for a first time slot, a first vertical network slice associated with a first network service, wherein the first vertical network slice comprises a first network slice associated with a first network and a second network slice associated with a second network that is different than the first network; and
   instantiating, for a second time slot, a second vertical network slice associated with a second network service, wherein the second vertical network slice comprises a third network slice associated with the first network and a fourth network slice associated with the second network.

16. The non-transitory machine-readable medium of claim 15, wherein the first network is a radio access network and the second network is a core network.

17. The non-transitory machine-readable medium of claim 15, wherein the first network slice comprises at least one of a backhaul slice, or an access slice.

18. The non-transitory machine-readable medium of claim 15, wherein the first vertical network slice facilitates pairing slices from the first network and the second network.

19. The non-transitory machine-readable medium of claim 18, wherein the pairing employs a software defined networking management function.

20. The non-transitory machine-readable medium of claim 18, wherein the pairing facilitates logical connectivity between the first network and the second network.

* * * * *